(12) United States Patent
Burkhardtsmaier

(10) Patent No.: US 8,095,274 B2
(45) Date of Patent: Jan. 10, 2012

(54) DEVICE AND METHOD FOR PROTECTING A VEHICLE OCCUPANT IN A MOTOR VEHICLE

(75) Inventor: Guenter Burkhardtsmaier, Goeggingen (DE)

(73) Assignee: TRW Automotive GmbH, Alfdorf (DE)

( * ) Notice: Subject to any disclaimer, the term of this patent is extended or adjusted under 35 U.S.C. 154(b) by 835 days.

(21) Appl. No.: 12/156,071

(22) Filed: May 29, 2008

(65) Prior Publication Data
US 2008/0296883 A1 Dec. 4, 2008

(30) Foreign Application Priority Data
Jun. 1, 2007 (DE) .................. 10 2007 025 702

(51) Int. Cl.
*B60R 22/00* (2006.01)
(52) U.S. Cl. .............. 701/45; 280/734; 280/735
(58) Field of Classification Search ............ 701/45, 701/46, 47; 180/268, 271, 273; 280/734, 280/735, 801, 803
See application file for complete search history.

(56) References Cited

U.S. PATENT DOCUMENTS

| | | | |
|---|---|---|---|
| 6,650,982 B2 | 11/2003 | Kopetzky | |
| 7,114,590 B2 * | 10/2006 | McFalls et al. | 180/268 |
| 2006/0229784 A1 | 10/2006 | Bachmann et al. | |

FOREIGN PATENT DOCUMENTS

| | | |
|---|---|---|
| DE | 19720360 | 11/1998 |
| DE | 10142792 | 4/2003 |
| DE | 10133759 | 7/2003 |
| DE | 10230486 | 1/2004 |
| DE | 10306159 | 8/2004 |
| DE | 102004013598 | 10/2005 |
| DE | 69924759 | 3/2006 |
| DE | 102004040829 | 3/2006 |
| DE | 102005007865 | 9/2006 |
| DE | 102005018078 | 10/2006 |
| DE | 102005041376 | 3/2007 |
| EP | 1256493 | 11/2002 |
| EP | 1208021 | 10/2003 |
| WO | 2006119857 | 11/2006 |
| WO | 2007042129 | 4/2007 |

* cited by examiner

*Primary Examiner* — Faye M. Fleming
(74) *Attorney, Agent, or Firm* — Tarolli, Sundheim, Covell & Tummino LLP

(57) ABSTRACT

A device for protection of a vehicle occupant (14) in a motor vehicle (10) comprises a means for detecting a maloperation during use of a seat belt system by the vehicle occupant (14). The detection means includes means for characterizing the vehicle occupant (14) and individually checks operation of the seat belt system by taking into account the characterization. A method for protecting a vehicle occupant (14) in a motor vehicle (10) with a seat belt system comprises the following steps:

- characterization of the vehicle occupant (14), and
- individual check of operation of the seat belt system for a maloperation by taking into account the characterization.

24 Claims, 1 Drawing Sheet

DEVICE AND METHOD FOR PROTECTING A VEHICLE OCCUPANT IN A MOTOR VEHICLE

TECHNICAL FIELD

This invention relates to a device and a method for protecting a vehicle occupant in a motor vehicle.

BACKGROUND OF THE INVENTION

It is generally known that maloperation during use of a seat belt system can lead to injuries in a case of collision. The most frequent operating error and hence chief cause for such injuries, in particular in the abdominal region, is a "wrong" position of the seat belt, which is neglected by the vehicle occupant or not at all recognized as such. Wrong position here is understood to be a seat belt path on the body of the vehicle occupant, which does not correspond to the respective recommendations of experts in vehicle occupant safety. Ideally, a seat belt should extend over the body of the vehicle occupant such that the upper edge of the lap belt portion lies below the two anterior iliac spines, so that it can act on the bony pelvis rather directly and without a risk of slipping.

A device for protecting a vehicle occupant in a motor vehicle comprising a means for detecting a maloperation during use of a seat belt system by the vehicle occupant is shown in DE 699 24 759 T2. The device includes a belt retractor, which generally can detect an improper use of the shoulder belt and lap belt portions of a seat belt. Monitoring requires an electric field generator means especially provided for this purpose and a modified seat belt in the form of an iron-containing material mounted on the belt or woven into the same.

As regards the retrieval of personal settings in a vehicle—beside the established memory systems, often bound to the vehicle keys, which provide for storing and restoring individual seat, mirror and steering column settings—DE 10 2005 018 078 A1 discloses an expanded system with an on-board information means and a portable storage means. The storage means can be used for storing a user profile with personal actuation data for mechanical and electronic vehicle means (e.g. navigation system, seat adjustment, air conditioning, car radio).

DE 10 2005 007 865 A1 describes a uniform adjusting system for all personalizable vehicle functions. Examples for the adjustable vehicle functions include the activation/deactivation of the passenger airbag and the automatic closing of the doors starting at a defined vehicle speed. The personalized settings are stored in a vehicle key.

From DE 10 2004 040 829 A1, an operating means is known, by means of which a plurality of defaults for certain vehicle elements (driver assistance, inter alia) are selectable in dependence on the current driving situation.

With respect to an adjustment of a vehicle safety system to a vehicle occupant, there are not only known simple sensor systems, which detect the mere presence of a vehicle occupant, but also advanced systems, which allow a rough characterization of the vehicle occupant in terms of weight, size and seat position. Examples for such systems with reference to the control of belt-type restraint systems are described for instance in EP 1 208 021 B1 and EP 1 256 493 A2.

It is an object of the present invention to reliably detect a maloperation during use of a seat belt system.

BRIEF SUMMARY OF THE INVENTION

This object is solved according to the invention by a device for protection of a vehicle occupant in a motor vehicle, comprising a means for detecting a maloperation during use of a seat belt system by the vehicle occupant. The detection means includes means for characterization of the vehicle occupant and individually checks the operation of the seat belt system by taking into account the characterization. Including characteristic features of the respective vehicle occupant (physique, seating behavior, etc.) in accordance with the invention provides for a check which goes much further than in generic devices, which are not capable at all of detecting or taking into account certain scenarios due to a lack of possibilities for analysis. The device in accordance with the invention nevertheless can be realized at low cost, as available and well-established components largely can be used, which in part have already been used in standard or special equipment of motor vehicles so far.

The invention also provides a method for protecting a vehicle occupant in a motor vehicle with a seat belt system. The method comprises the following steps:
 characterization of the vehicle occupant, and
 individual check of operation of the seat belt system for a maloperation by taking into account the characterization.

BRIEF DESCRIPTION OF THE DRAWINGS

In the drawing, the only FIGURE schematically shows a motor vehicle which is equipped with the device in accordance with the invention.

DETAILED DESCRIPTION OF THE PREFERRED EMBODIMENTS

Figure 1:
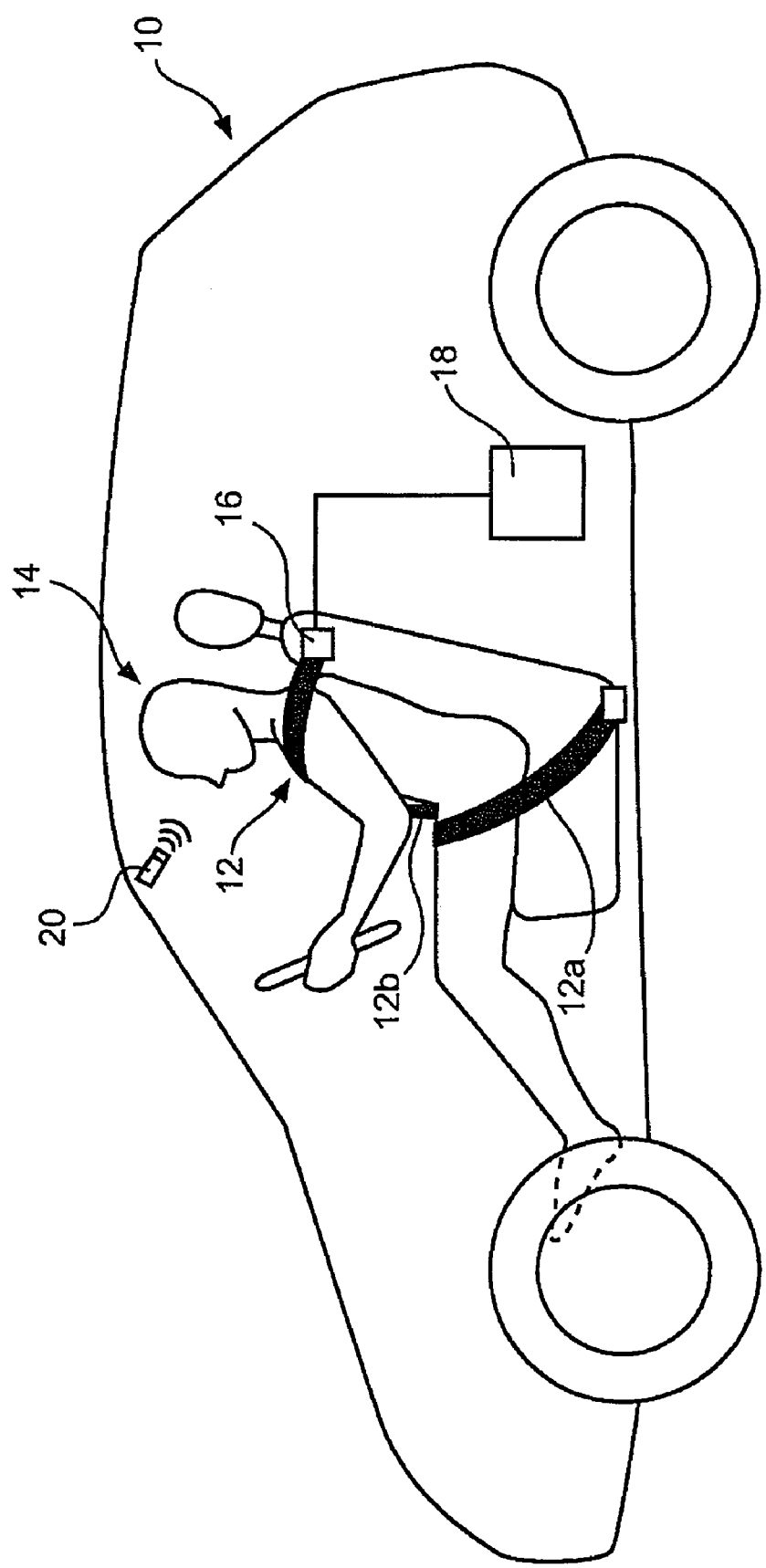

The motor vehicle 10 as shown in the FIGURE has a seat belt system which includes a seat belt 12 for a vehicle occupant 14 and an electric belt retractor 16 with an electric motor. The electric belt retractor 16 can be actuated via a control. For the sake of simplicity, all communicating controls of the device of the invention and an incorporated on-board computer system are referred to as control 18.

The seat belt system, more precisely the electric belt retractor 16, also has a sensor unit for the time-dependent measurement of the absolute and relative belt extension and of the corresponding belt force (the force acting on the belt webbing of the seat belt 12 at the belt retractor 16). The value of the belt extension is supplemented with the values of a seat position sensor, as the knowledge of the longitudinal seat setting, the vertical seat setting, etc. provides for a better evaluation/interpretation of the measured belt extension. A belt buckle sensor, e.g. in the form of a simple switch or the like, signals whether the seat belt 12 is fastened. Representative signals of the belt retractor 16, of the seat position sensor and of the belt buckle sensor are supplied to the control 18.

Furthermore, the vehicle 10 includes a system for characterizing a vehicle occupant 14. Characterizing is understood to be an allocation of the vehicle occupant 14 to one of several predefined classes (classification) or an actual vehicle occupant recognition (identification). The occupant characterization system comprises sensors for detecting biomechanical and/or biometric data, such as a seat occupation sensor, a weight sensor, a fingerprint reader, optical sensors 20 or the like, which transmit occupant-specific data to the control 18. For characterizing the vehicle occupant 14, certain detected settings which the vehicle occupant 14 has made can also be used, so that for instance a longitudinal seat position sensor and a belt extension sensor can also be ascribed to the occupant characterization system.

The control 18 has access to a database in which a plurality of data records can be stored. Each data record includes occupant-specific data, which the control 18 can compare with the data detected by the sensors of the occupant characterization system in connection with a characterization check.

Finally, the vehicle 10 also includes means for indicating a maloperation and/or a means for blocking a vehicle function, which are connected with the control 18.

In the following, mode of function and operation of the device in accordance with the invention will be described by way of example, the description being divided into a learning phase and a plurality of test runs.

In the learning phase, the occupant-specific values of a vehicle occupant 14 (weight, belt extension, fingerprint, etc.) are recorded and stored in the database as a data record with an unambiguous identification of the vehicle occupant 14 (e.g. his name). Recording the data can be effected in one or more succeeding cycles.

In the learning phase, there is also created an individual default profile for the vehicle occupant 14 and stored in the vehicle 10, wherein the profile can for instance comprise the following preferred settings:

seat settings,
headrest position,
mirror settings,
belt height,
steering wheel position,
suspension hardness,
inside temperature,
radio stations.

The preferred settings are allocated to the previously recorded data record. The default profile can also (alternatively or in addition) be stored in a vehicle key.

These procedures can be repeated for further users of the vehicle 10.

The device now is capable of recognizing a previously registered user in the vehicle and of making his/her desired settings according to his/her default profile. Identification is effected either by evaluation of the data detected by the occupant characterization system, in that the measured values are compared with those of the stored data records and the data record with the best match is selected, and/or by evaluation of the data stored in the used key and/or by manual selection on the part of the user. The identity check can be completed by a plausibility check (e.g. as to whether the data of the occupant characterization system are compatible with those of the vehicle key or of the manual input of the user).

After fastening the seat belt 12, which the control 18 registers by receiving a corresponding signal from the belt buckle sensor, the device checks whether there is a maloperation during use of the seat belt system by taking into account the previously detected identity. This will be explained in detail below with reference to a few exemplary test runs, which simulate possible real situations.

First Test Run

The identified vehicle occupant 14 deliberately fastens the lap belt portion 12a of the seat belt 12 too high, so that it does not extend below the two anterior iliac spines of the vehicle occupant 14. As compared to the value stored in the data record of the identified vehicle occupant 14, the belt extension is increased by 40 mm, which is registered by the belt extension sensor. The logic of the control 18 interprets the unexpectedly high belt extension as follows (inclusive-OR relation):

actual vehicle occupant is not the vehicle occupant identified,
belt slack is present,
operating error when fastening the seat belt,
error not known to the logic.

Some time (e.g. two seconds) after inserting the buckle tongue of the seat belt 12 into the belt buckle, the electric belt retractor 16 is activated automatically. The electric belt retractor 16 tensions the seat belt 12 in a defined way, in that it retracts the seat belt 12 for a specific time (e.g. about two seconds) with a specific force (e.g. about 100 N). Subsequently, this procedure will be referred to as "belt check".

In accordance with a first case of simulation, the lap belt portion 12a remains lying in the position fastened high, strangling a little the belly of the vehicle occupant 14. When tensioning the seat belt 12, a force/belt extension characteristic, a force/time characteristic and a belt extension/time characteristic are created and compared with stored data of the vehicle occupant data record. Upon tensioning, the belt extension sensor still registers a value which is too high; the belt extension ultimately has only decreased insignificantly by 15 mm.

This elastic rebound behavior upon tensioning the seat belt 12 (upon loosening the tension, the belt webbing again was extended elastically—approximately to the original value) is interpreted by the logic as follows (inclusive-OR relation):

vehicle occupant not identified correctly,
the presence of a belt slack is excluded due to the force/belt extension characteristic (too high and unexpected elasticity upon constriction),
operating error when fastening the seat belt,
error not known to the logic.

The unexpectedly too high belt extension after the belt check is interpreted by the logic as follows (inclusive-OR relation):

vehicle occupant not identified correctly,
belt slack excluded (belt extensions before and after tensioning too similar to each other),
operating error when fastening the seat belt,
error not known to the system.

The device reacts to the detections and possible interpretations in that it correspondingly indicates to the vehicle occupant 14 that there is an inconsistency with the personal profile as regards the fastened seat belt 12.

The vehicle occupant 14 now can choose correspondingly between the options "continue" and "ignore". If the vehicle occupant 14 chooses "ignore", the device lets the vehicle occupant 14 do what he wants without any further intervention.

However, if the vehicle occupant 14 chooses "continue", the device explains its diagnosis and requests the vehicle occupant 14 to check and possibly correct his belt fastening result. As soon as the vehicle occupant 14 has again fastened the seat belt, this time correctly (lap belt portion 12a of the seat belt 12 extends below the two anterior iliac spines) with the expected belt extension, the belt check will be performed again and this time ends with a positive result. The device allows the vehicle occupant 14 to start without any further intervention.

Second Test Run

The second test run starts under the same conditions as the first test run described above, i.e. the identified vehicle occupant 14 deliberately fastens the lap belt portion 12a of the seat belt 12 too high, and the belt extension now is increased by 40 mm. The logic of the control 18 accordingly interprets the unexpectedly high belt extension like in the first test run.

In this test run, however, the seat belt 12 moves from the too high into the correct position, when tensioning the belt during the belt check. Upon tensioning, the belt extension sensor registers a distinctly smaller value for the remaining belt extension; since the lap belt portion 12a has been shifted downwards, the belt extension approximately has been adjusted to the expected value.

This hardly elastic (rather plastic) rebound behavior when tensioning the seat belt 12 (the belt webbing hardly has been extended again when loosening the tension—the belt extension finally had a completely different value) is interpreted by the logic as follows (inclusive-OR relation):

belt slack possible due to the force/belt extension characteristic (low resistance when shifting the seat belt),
operating error when fastening the seat belt,
error not known to the logic.

The approximately expected belt extension after the belt check is interpreted by the logic as follows (inclusive-OR relation):

belt slack (belt extensions before and after tensioning distinctly different),
operating error when fastening the seat belt,
error not known to the logic.

The device reacts to the detections and possible interpretations in that it correspondingly indicates to the vehicle occupant 14 that there is an inconsistency with the personal profile as regards the fastened seat belt 12. If the vehicle occupant 14 chooses the option "ignore", the device lets the vehicle occupant 14 do what he wants without any further intervention.

However, if the vehicle occupant 14 chooses the option "continue", the device explains its diagnosis (i.e. the belt webbing geometry has changed considerably during the belt check; the belt webbing could strangle more than expected) and requests the vehicle occupant 14 to check and possibly correct his belt fastening result. As soon as the vehicle occupant 14 has again fastened the seat belt, this time correctly with the expected belt extension, the belt check will be performed again and this time ends with a positive result. The device allows the vehicle occupant 14 to start without any further intervention.

Third Test Run

The identified user 14 wears a padded winter jacket, which when standing extends below his crotch by about 5 cm. When the vehicle occupant 14 is seated, jacket bolsters thus are present between the backrest of the seat and the back and on the lap of the vehicle occupant 14—but not between the seat surface and the bottom of the vehicle occupant 14. When fastening the seat belt, the vehicle occupant 14 will place the lap belt portion 12a of the seat belt 12 over the jacket such that it does not extend below the two anterior iliac spines.

After fastening the seat belt, the lap belt portion 12a remains lying in the arc over the jacket as chosen by the vehicle occupant 14. The belt extension is registered to be increased by 80 mm. The logic of the control 18 interprets the unexpectedly high belt extension like in the first test run.

In the subsequent belt check, the seat belt 12 initially strangles into the jacket to a noticeable extent. When the tension is loosened, the constriction is elastically reduced a little, but no longer back into the starting position. The lap belt portion 12a still does not lie below the iliac spines, and the belt extension sensor registers a substantially reduced belt extension, which is, however, still increased by 40 mm.

The elastic rebound behavior upon tensioning the seat belt 12 (the belt webbing again was extended elastically upon loosening the tension—but far below the original value) is interpreted by the logic as follows (inclusive-OR relation):

belt slack probable (due to the force/belt extension characteristic, possible relation between elastic and plastic behavior upon removing the constriction),
operating error when fastening the seat belt,
error not known to the logic.

The unexpectedly too high belt extension after the belt check is interpreted by the logic as follows (inclusive-OR relation):

belt slack possible or probable (belt extensions before and after tensioning are different, but in a specific relation with each other),
operating error when fastening the seat belt,
error not known to the logic.

The device reacts to the detections and possible interpretations in that it correspondingly indicates to the vehicle occupant 14 that there is an inconsistency with the personal profile as regards the fastened seat belt 12, as an unusually large amount of belt slack was registered during the belt check. If the vehicle occupant 14 now chooses the option "ignore", the device lets the vehicle occupant 14 do what he wants without any further intervention.

However, if the vehicle occupant 14 chooses the option "continue", the device explains its diagnosis (i.e. the belt geometry has changed considerably during the belt check) and requests the vehicle occupant 14 to check and possibly correct his belt fastening result. As soon as the vehicle occupant 14 has again fastened the seat belt, this time correctly and with the expected belt extension, the belt check is performed again and this time ends with a positive result. The device allows the vehicle occupant 14 to start without any further intervention.

Fourth Test Run

The user 14 gets into the vehicle 10 and does not fasten the seat belt 12 at all. When the vehicle 10 starts to move, the device, to be more precise the belt buckle sensor, indicates that the seat belt 12 is not fastened. This is interpreted by the logic as "rolling vehicle with the vehicle occupant 14 present, but not wearing a seat belt".

The device reacts in that it correspondingly indicates to the vehicle occupant 14 that he probably has not fastened the seat belt 12. If the vehicle occupant 14 chooses the option "ignore", the device lets the vehicle occupant 14 do what he wants without any further intervention.

However, if the vehicle occupant 14 chooses the option "continue", the device explains its diagnosis and requests the vehicle occupant 14 to fasten the seat belt 12 now. As soon as the vehicle occupant 14 has fastened the seat belt 12, the belt check is performed. With a positive result, the device allows the vehicle occupant 14 to start without any further intervention.

Fifth Test Run

The vehicle occupant 14 deliberately fastens the lap belt portion 12a of the seat belt 12 too low, so that it rather extends over the thighs than over the pelvis of the vehicle occupant 14.

The lap belt portion 12a remains lying on the thighs as placed. The belt extension approximately corresponds to the expected value. The logic of the control 18 interprets the registered belt extension as follows (AND relation):

vehicle occupant identified correctly,
no belt slack,
no operating error when fastening the seat belt,
no error not known to the logic.

During the subsequent belt check, the seat belt 12 initially is briefly pressed onto the thighs, with the lap belt portion 12a hardly moving any further up towards the pelvis. Even when loosening the tension, the lap belt portion 12a does hardly move at all; the belt webbing tightly rests on the thighs. The constriction is reduced a little, but no longer back into the starting position.

The force/belt extension characteristic recorded when loosening the tension exhibits a pronounced elastic behavior and is interpreted by the logic as follows (AND relation):
vehicle occupant identified correctly,
no belt slack,
no operating error when fastening the seat belt,
no error not known to the logic.

(Reason: Biomechanical profiles are satisfied within the specified tolerance corridors; tension can rather be increased a little, and the body of the vehicle occupant 14 "feels a bit more elastic".)

The approximately expected belt extension after the belt check is interpreted by the logic as follows (AND relation):
vehicle occupant identified correctly,
no belt slack,
no operating error when fastening the seat belt,
no error not known to the logic.

The device reacts with or without positive feedback, as no operating error was detected.

Sixth Test Run

Before inserting the buckle tongue, the vehicle occupant 14 guides the seat belt 12 such that the lap belt portion 12a has an ideal run, but the shoulder belt portion 12b does not run over the shoulder of the vehicle occupant 14, but below the left upper arm (near the arm pit) across the chest. Upon fastening the seat belt, the lap belt portion 12a maintains its ideal run, whereas the shoulder belt portion 12b is a bit tight on the left chest and below the left arm pit. The belt extension is increased by 80 mm. The unexpectedly high belt extension is interpreted by the logic of the control like in the first test run.

When tensioning during the belt check, the left shoulder of the vehicle occupant 14 is lifted towards the deflection fitting on the B-pillar as a result of the unusually steep belt run. When loosening the tension, the shoulder is lowered again. After tensioning, the belt extension sensor still registers a value which is too high; the belt extension has been reduced from initially 80 mm to 60 mm.

The force/belt extension, force/time and belt extension/time characteristics recorded during the belt check qualitatively are so far away from the expected data that the logic here already registers an unknown deviation. This deviation in connection with the elastic rebound behavior after tensioning the seat belt 12 (the belt webbing again was extended elastically upon loosening the tension—but below the original value) is interpreted by the logic as follows (AND relation):
no incorrectly identified vehicle occupant (characteristics too unusual for this),
no belt slack (due to the unusual force/belt extension/time characteristics),
no operating error when fastening the seat belt (characteristics too unusual for this),
error not known to the logic.

The unexpectedly too high belt extension after the belt check is interpreted by the logic as unknown error.

The device reacts to the detections and possible interpretations in that it accordingly indicates to the vehicle occupant 14 that there is an inconsistency with the personal profile as regards the fastened seat belt 12, as an unusually large amount of belt slack was registered during the belt check, and that further inconsistencies were detected. If the vehicle occupant 14 now chooses the option "ignore", the device lets the vehicle occupant 14 do what he wants without any further intervention.

However, if the vehicle occupant 14 chooses the option "continue", the device explains its diagnosis (i.e. the belt geometry appears to be doubtful and has changed considerably during the belt check) and requests the vehicle occupant 14 to check and possibly correct his belt fastening result. As soon as the vehicle occupant 14 has again fastened the seat belt, this time correctly with the expected belt extension, the belt check is performed again and this time ends with a positive result. The device allows the vehicle occupant 14 to start without any further intervention.

Result of the Test Runs

Each (provoked) maloperation during use of the seat belt system by the vehicle occupant 14 leads to a reaction which is perceived by the vehicle occupant 14. The vehicle occupant 14 can decide deliberately whether to understand this as a suggestion for correction or improvement.

Alternatively or in addition to the messages issued to the vehicle occupant 14 in the case of a maloperation, an automatic blocking of a vehicle function can be initiated (e.g. "immobilizer").

As already indicated above, a classification for vehicle occupants can already be specified in a simplified variant of the device. In this case, new data records are not stored in the database, and there is no actual identification of the user, but merely an allocation to one of the specified classes.

The invention claimed is:

1. A device for protection of a vehicle occupant in a motor vehicle, the device comprising a means for detecting a maloperation during use of a seat belt system by the vehicle occupant prior to a vehicle collision, the detection means including means for characterization of the vehicle occupant, and an individually checking operation of the seat belt system by taking into account the characterization.

2. The device according to claim 1, wherein the detection means includes a database in which occupant-specific data records for characterizing vehicle occupants are stored or can be stored.

3. The device according to claim 2, wherein the detection means includes sensors for detecting occupant-specific data and compares the detected data with data records stored in the database.

4. The device according to claim 3, wherein the occupant-specific data comprise at least one of biomechanical data and biometric data.

5. The device according to claim 2, wherein the detection means is designed such that a new data record related to a specific vehicle occupant can be added to the database.

6. The device according to claim 2, wherein an individual default profile can be allocated to a data record.

7. The device according to claim 6, wherein the default profile can be adjusted automatically.

8. The device according to claim 6, wherein the default profile can at least partly be adjusted manually.

9. The device according to claim 1, wherein the detection means includes means for a defined tensioning of a seat belt of the seat belt system.

10. The device according to claim 1, further comprising a reaction means, which in case a maloperation is detected during the individual check initiates one of a) a message to be perceived by the vehicle occupant and b) a blocking of a vehicle function.

11. A method for protecting a vehicle occupant in a motor vehicle with a seat belt system, the method comprising the following steps:
characterization of the vehicle occupant, and
individual check of operation of the seat belt system prior to a vehicle collision for a maloperation by taking into account the characterization.

12. The method according to claim 11, wherein the individual check of the operation of the seat belt system includes a defined tensioning of a seat belt of the seat belt system.

13. The method according to claim 12, wherein the defined tensioning of the seat belt is effected with a specified force.

14. The method according to claim 12, wherein the defined tensioning is effected for a specified period.

15. The method according to claim 11, wherein in case a maloperation is detected during the individual check, a message to be perceived by the vehicle occupant is issued or a blocking of a vehicle function is initiated.

16. The device according to claim 1, wherein the means for detecting maloperation comprises a means for detecting maloperation of the seat belt system during buckling of the seat belt system.

17. The device according to claim 1 further comprising means for tensioning the seat belt in response to the individually checking operation of the seat belt system.

18. The device according to claim 1, wherein the means for detecting maloperation of the seat belt system detects at least one of improper seat belt positioning on the occupant and an unbuckled occupant.

19. The device according to claim 1, wherein the means for detecting maloperation of the seat belt system correlates the characterization of the vehicle occupant with a desired seat belt webbing extension in the individually checking operation.

20. The method according to claim 11, wherein the maloperation of the seat belt system is detected during buckling of the seat belt system.

21. The method according to claim 11 further comprising the step of tensioning the seat belt in response to the individual checking operation of the seat belt system.

22. The method according to claim 11, wherein the means for detecting maloperation of the seat belt system detects at least one of improper seat belt positioning on the occupant and an unbuckled occupant.

23. The method according to claim 11, wherein the means for detecting maloperation of the seat belt system correlates the characterization of the vehicle occupant with a desired seat belt webbing extension in the individually checking operation.

24. A method for protecting a vehicle occupant in a motor vehicle with a seat belt system, the method comprising the following steps:
   detecting at least one characterization of the vehicle occupant;
   correlating the detected vehicle occupant characterization with a desired amount of seat belt webbing extension;
   determining the amount of actual seat belt webbing extension when the vehicle occupant is buckled in the seat belt system; and
   retracting the seat belt webbing to reduce the difference between the desired seat belt webbing extension and the actual seat belt webbing extension.

* * * * *